United States Patent
Raasch

[11] 3,853,902
[45] Dec. 10, 1974

[54] HALOALKYL-4-THIAZOLIDINONE

[75] Inventor: Maynard S. Raasch, Wilmington, Del.

[73] Assignee: E. I. du Pont de Nemours and Company, Wilmington, Del.

[22] Filed: Dec. 30, 1971

[21] Appl. No.: 214,378

[52] U.S. Cl................ 260/306.7 R, 71/90, 71/91, 260/33.8, 260/92.8, 260/301
[51] Int. Cl.............................................. C07d 91/16
[58] Field of Search......................... 260/306.7, 301

[56] References Cited
UNITED STATES PATENTS

| | | |
|---|---|---|
| 3,177,222 | 4/1965 | Surrey............................ 260/306.7 |
| 3,270,027 | 8/1966 | Surrey............................ 260/306.7 |
| 3,377,355 | 4/1968 | Surrey............................ 260/306.7 |

OTHER PUBLICATIONS
Zeifman et al., Chem. Abstracts, 61:16065–16066 and 62:540–541 (1964).

*Primary Examiner*—Richard J. Gallagher

[57] ABSTRACT

Compounds of the formula

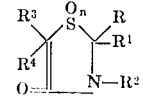

and

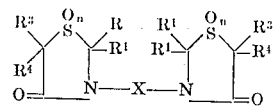

wherein R and $R^1$ are —$CF_2H$, $CF_2Cl$, —$CF_3$ or —$C_2F_5$, $R^2$ is hydrogen, alkyl, alkenyl, aryl, aralkyl, hydroxyalkyl, carboxyalkyl, or haloalkyl of up to 8 carbon atoms;

$X$ is polymethylene of up to 8 carbon atoms, or —$CH_2CO$—$CH_2$—.

$R^3$ and $R^4$ are hydrogen, aryl, alkaryl, aralkyl, cycloalkyl, alkyl or carboxyalkyl each of up to 8 carbons, and $n$ is 0, 1 or 2 can be made by reaction of an α-mercapto acid with a haloalkylidene imine (Schiff base). If desired the heterocyclic sulfur atom can be oxidized and/or substituents introduced into nitrogen by conventional methods. The compounds are useful as plasticizers and in some instances as plant hormones.

8 Claims, No Drawings

HALOALKYL-4-THIAZOLIDINONE

FIELD OF INVENTION

This invention relates to novel 4-thiazolidinones, having at least two fluorines on each 1-2 carbon hydrocarbyl or halohydrocarbyl group in the 2-position.

BACKGROUND OF THE INVENTION

Numerous 4-thiazolidinones have been prepared and used in biological applications. For example, Bishop et al. J. Chem. Soc. 2384-5 (1963) describes the compounds

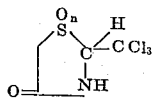

wherein $n$ is 0, 1, and 2.

Y. V. Zeifman and N. P. Gambaryan, Bull. Acad. Sci. USSR, Div. Chem. Sci. 1589 (1964) have reported the compounds

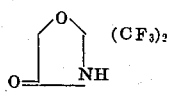

and

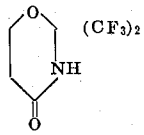

and ibid p. 1531 have reported

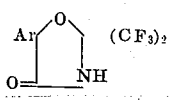

No 4-thiazolidinones have been reported with fluoroalkyl groups bonded directly to the 2-position.

DESCRIPTION OF THE INVENTION

The compounds of the present invention are heterocyclic compounds having the formula

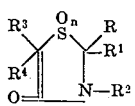

or

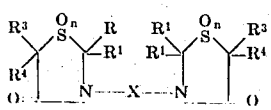

wherein $n$ is 0, 1 or 2

R and $R^1$ are each selected from $-CH_2H$, $-CF_2Cl$, $-CF_3$, or $-C_2F_5$.

$R^3$ and $R^4$ are hydrogen, aryl, aralkyl, alkaryl, alkenyl, cycloalkyl, alkyl or carboxyalkyl each of up to 8 carbon atoms.

$R^2$ is hydrogen, alkyl, alkenyl, aryl, aralkyl, hydroxyalkyl, carbalkoxy, and haloalkyl each of up to 8 carbon atoms, and X is polymethylene of up to 8 carbon atoms, or $-CH_2COCH_2-$.

In the above the term "hydrocarbyl" is employed to designate a radical derived from a hydrocarbon by removal of a hydrogen atom. The term includes aryl groups derived from hydrocarbons having a benzene ring by removal of a nuclear hydrogen atom, alkaryl groups wherein the hydrocarbyl group is formed by removal of an aliphatic hydrogen atom from a benzene compound having at least one lower alkyl side chain, cycloaliphatic groups derived from a hydrocarbon having a ring of three or more carbon atoms by removal of an aliphatic hydrogen atom, and alkyl groups derived from alkanes by removal of an aliphatic hydrogen atom.

The term "lower alkyl" is intended to mean alkyl groups of up to four carbon atoms unless otherwise limited.

The term lower acyl is intended to mean acyl groups derived from alkanoic acids having up to four carbon atoms.

The compounds are made by reacting α-mercapto acids or esters with fluoroalkylidenimines. Procedures for preparing the imines are described by W. J. Middleton and C. G. Krespan, J. Org. Chem., 30, 1398 (1965), W. J. Middleton, U.S. Pat. No. 3,342,864 (1967), and Y. V. Zeifman et al., Proc. Acad. Sci. USSR, 153, 1032 (1963). The reaction may be carried out in the absence of solvent. In the case of rapid reactions, an inert solvent may be useful to moderate the reaction. Such solvents include carbon disulfide, dichloromethane, chloroform, carbon tetrachloride, 1,2-dichloroethane, 1,1,1-trichloroethane, 1,2,2-trichloro-1,1,2-trifluoroethane, benzene, chlorobenzene, toluene, hexane, ether, 1,2-dimethoxyethane and acetonitrile. Depending on the reactivity of the reactants and the physical properties of the imine, the reaction is carried out with cooling, heating in an open vessel or under reflux, or by heating in a sealed vessel. The products are isolated and purified by conventional methods, such as crystallization and distillation.

When the reaction is carried out with an imine of the formula $RR^1C=NH$, the resulting heterocycle contains an NH group upon which substitution reactions may be performed. N-derivatives of heterocycles are conveniently made by forming an alkali metal salt (e.g., lithium, sodium, or potassium) and treating with a halogen compound as illustrated by Examples 11–17. This may be done in the absence of a solvent, but the use of polar solvents such as alcohols, dimethylformamide, dimethyl sulfoxide, and hexamethylphosphoramide is advantageous.

The heterocyclic sulfur atom in the above compounds can be oxidized by peracetic acid to give either the 1-oxide or the 1,1-dioxide as shown in Example 9.

These new compounds are all useful as plasticizers for such polymers as polyvinyl chloride. They are incorporated preferably in solution in the polymer at amounts of 5–50 percent by weight. The exact amount depends upon the degree of plasticization required but generally 10–30 percent give desired properties in the polymeric material.

Some of the compounds of the present invention, notably 2,2-bis(chlorodifluoromethyl)-4-thiazolidone, have plant hormone activity. Its N-methyl derivative stimulates the production of ethylene by plants.

This invention is further illustrated by the following examples which should not, however, be construed as fully delineating the scope of this discovery.

EXAMPLE 1

2,2-Bis(trifluoromethyl)-4-thiazolidinone

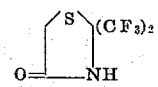

Hexafluoroisopropylidenimine (8.25 g, 0.05 mol) was added to 5.06 g (0.055 mol) of mercaptoacetic acid in 50 ml of dichloromethane at 0°C contained in a flask with an ice condenser. After 8 hours the solvent was allowed to evaporate and the crystals were washed with water. After air drying, the 8.33 g of product was recrystallized from carbon tetrachloride to give 8.0 g (67 percent) mp 114.5°–116°C; $^1$H nmr (CDCl$_3$) 3.77 ppm (s, CH$_2$), 8.90 (NH); $^{19}$F nmr 76.5 ppm (s, vs. F-11); ir 3.15, 3.25 $\mu$(NH), 3.47 (sat. CH), 5.86 (lactam C=O).

Anal. Calcd. for C$_5$H$_3$F$_6$NOS: C, 25.10; H 1.26; N, 5.86
Found: C, 25.13; H, 1.16; N, 5.64.

EXAMPLE 2

2,2-Bis(trifluoromethyl)-3-methyl-4-thiazolidinone

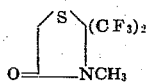

N-Methylhexafluoroisopropylidenimine (7.16 g, 0.03 mol), 3 ml of dichloromethane and 3.03 g (0.033 mol) of mercaptoacetic acid were sealed in a glass tube and heated at 100°C for 16 hours. The product was washed with water; yield, ca 7 g (91 percent). After recrystallization from hexane it melted at 47–49°C.

Anal. Calcd. for C$_6$H$_5$F$_6$NOS: C, 28.47; H, 1.99; N, 5.53
Found: C, 28.77; H, 2.11; N, 5.75.

EXAMPLE 3

2,2-Bis(trifluoromethyl)-3-phenyl-4-thiazolidinone

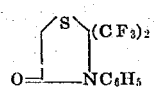

A mixture of 9.64 g (0.04 mol) of N-(hexafluoroisopropylidene)aniline and 3.88 g (0.044 mol) of mercaptoacetic acid was heated on a steam bath for 4 hours. The viscous syrup crystallized when stirred with 25 ml of 5 percent sodium hydroxide solution. The product was filtered off and washed with water. It was recrystallized from methanol by cooling in Dry Ice; yield, 4.02 g (32 percent) in 3 crops. This was sublimed to give 3.47 g, mp 109.5°–110.5°C; $^1$H nmr (CDCl$_3$) 3.78 ppm (s, CH$_2$), 7.4 (m, C$_6$H$_5$); $^{19}$F nmr 70.5 ppm (s, vs F-11).

Anal. Calcd. for C$_{11}$H$_7$F$_6$NOS: C, 41.90; H, 2.24; N, 4.44;
S, 10.17
Found: C, 41.63; H, 2.17; N, 4.52;
S, 10.31.

EXAMPLE 4

2,2-Bis(trifluoromethyl)-5-methyl-4-thiazolidone

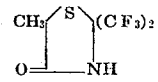

The reaction was carried out as in Example 1 except that 5.83 g of thiolactic acid was used in place of mercaptoacetic acid. The product (7.94 g) was recrystallized from hexane to give 7.14 g (57 percent), mp 86.5°–88.5°C, $^1$H nmr (CDCl$_3$) 2.57 ppm (d, CH$_3$), 4.07 (quartet, CH), 8.92 (broad peak, NH); ir 3.14, 3.23 $\mu$ (NH), 3.47 (sat. CH), 5.82 (lactam C=O).

Anal. Calcd. for C$_6$H$_5$F$_6$NOS: C, 28.47; H, 1.99; N, 5.53
Found: C, 2863; H, 1.88; N, 5.58.

EXAMPLE 5

2,2-Bis(trifluoromethyl)-5,5-dimethyl-4-thiazolidinone

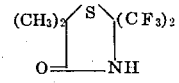

2-Mercaptoisobutyric acid (2.87 g, 0.024 mol) and 4.8 g (0.029 mol) of hexafluoroisopropylidenimine were sealed in a glass tube and heated at 100°C for 20 hours. The product was washed with 5% sodium bicarbonate and water. Recrystallization from hexane gave 2.35 g (37 percent), mp 128°–129°C.

Anal. Calcd. for C$_7$H$_7$F$_6$NOS: C, 31.47; H, 2.64; N, 5.24
Found: C, 31.26; H, 2.49; N, 5.17.

EXAMPLE 6

5-Carboxymethyl-2,2-bis(trifluoromethyl)-1,3-thiazolidin-4-one

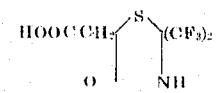

Hexafluoroisopropylidenimine (8.25 g, 0.05 mol), 10 ml of ether, and 7.50 g (0.05 mol) of mercaptosuccinic acid were sealed in a glass tube and heated at 100°C for 20 hours. The ether was evaporated and the product was washed with water and air dried; yield, 10.4 g (66 percent). Recrystallization from nitromethane left 9.1 g, mp 203°–208°C; $^1$H nmr [(CD$_3$)$_2$CO] ABX pattern 1.40 ppm (quartet, 2 upfield components split into doublets, J = 11 Hz; 2 downfield components split to doublets, J = 4 Hz; CH$_2$), 2.75 (pair of doublets, J = 4, CH) 7.10 (s, OH + NH, removed by D$_2$O); $^{19}$F nmr 9.2 ppm (A$_3$B$_3$ pattern, vs CCl$_2$FCCl$_2$F); ir 3.15; 3.25 $\mu$(NH), 3.46 (sat. CH), 3–4 $\mu$ (background absorption, COOH), 5.81, 5.85 (C=O).

Anal. Calcd. for C$_7$H$_5$F$_6$NO$_3$S: C, 28.28; H, 1.70; N, 4.71
Found: C, 28.41; H, 1.57; N, 4.95.

EXAMPLE 7

2-(Chlorodifluoromethyl)-2-(trifluoromethyl)-4-thiazolidinone

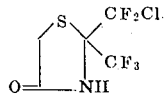

Chloropentafluoroisopropylidenimine (4 g, 0.022 mol) was added to 2.21 g (0.024 mol) of mercaptoacetic acid in 3 ml of dichloromethane with occasional cooling. After 16 hours the solvent was boiled off and the product was washed with water and air dried. Recrystallization from hexane left 3.80 g (68 percent) mp 97°–98°C.

Anal. Calcd. for C$_5$H$_3$ClF$_5$NOS: C, 23.50; H, 1.18; N, 5.48
Found: C, 23.70; H, 1.38; N, 5.37.

EXAMPLE 8

2,2-Bis(chlorodifluoromethyl)-4-thiazolidinone

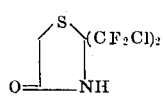

1,3-Dichlorotetrafluoroisopropylidenimine (6.55 g, 0.033 mol) was added slowly to 3.34 g (0.036 mol) of mercaptoacetic acid in 3 ml of dichloromethane and the solution was allowed to stand 1 hour. The solvent was boiled off and the product was washed with water. After air drying, the compound (5.88 g) was recrystallized from hexane; yield, 5.60 g (62 percent); mp 103.5°–104.5°C; $^1$H nmr (CDCl$_3$) 3.75 ppm (s, CH$_2$), 9.09 (broad peak, NH); $^{19}$F nmr 59 ppm (A$_2$B$_2$ pattern).

Anal. Calcd. for C$_5$H$_3$Cl$_2$F$_4$NOS: C, 22.08; H, 1.11; N, 5.15
Found: C, 22.06; H, 1.09; N, 4.85.

EXAMPLE 9

2,2-Bis(chlorodifluoromethyl)-4-thiazolidinone 1,1-dioxide

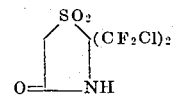

2,2-Bis(chlorodifluoromethyl)-4-thiazolidinone (6.4 g, 0.0235 mol), 15 ml of acetic acid and 9 ml (0.05 mol) of 40 percent peracetic acid were heated on a steam bath for 15 hours. The solution was reduced in volume and water was added. The sulfone (4.3 g) was filtered off, dried, and recrystallized from benzene to give 3.90 g (55 percent), mp 112°–114°C; $^1$H nmr [(CD$_3$)$_2$CO], 4.47 (pentet, J = 0.8 Hz, CH$_2$), ca. 9 ppm (extremely flat and broad, NH).

Anal. Calcd. for C$_5$H$_3$Cl$_2$F$_4$NO$_3$S: C, 19.75; H, 0.99; N, 4.61
Found: C, 20.02; H, 0.77; N, 4.43.

By using a thiazolidinone:peracetic acid ratio of 1:1, the sulfoxide is obtained.

EXAMPLE 10

2,2-Bis(chlorodifluoromethyl)-3-methyl-4-thiazolidinone

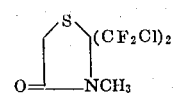

2,2-Bis(chlorodifluoromethyl)-4-thiazolidinone (4.1 g, 0.015 mol) was dissolved in 5 ml of water containing 0.6 g (0.015 mol) of sodium hydroxide. After addition of 10 ml of methanol and 2.56 g (0.018 mol) of methyl iodide, the solution was allowed to stand for 18 hours. The product was precipitated with water and filtered off (3 g). REcrystallization from hexane gave 2.66 g (62%) in two crops, mp 84°–85°C.

Anal. Calcd. For C$_6$H$_5$Cl$_2$F$_4$NOS: C, 25.18; H, 1.76; N, 4.90
Found: C, 24.86; H, 1.55; N, 4.71.

EXAMPLE 11

2,2-Bis(chlorodifluoromethyl)-3-ethyl-4-thiazolidinone

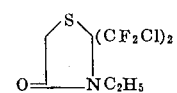

2,2-Bis(chlorodifluoromethyl)-4-thiazolidinone (8.16 g, 0.03 mol) was dissolved in 10 ml of H$_2$O and 20 ml of ethanol containing 1.2 g (0.03 mol) of sodium hydroxide. Ethyl iodide (6.2 g, 0.04 mol) was added and the mixture was refluxed for 5 hours. The ethanol was evaporated and the product was taken up in ether and washed three times with 5 percent potassium hydroxide. The ether solution was dried (MgSO$_4$) and distilled to give the ethyl derivative, bp 58°–61°C (0.2 mm). Crystallization from pentane by cooling in Dry Ice gave 1.8 g (20 percent) of a camphorlike solid, mp 45°–47°C.

Anal. Calcd for C$_7$H$_7$Cl$_2$F$_4$NOS: C, 28.02; H, 2.35; N, 4.67
Found: C, 27.88; H, 2.16; N, 4.51.

EXAMPLE 12

2,2-Bis(chlorodifluoromethyl)-3-butyl-4-thiazolidinone

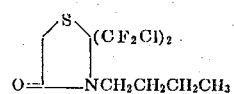

The butyl derivative was made analogously to the ethyl derivative (Example 11) but using n-butyl iodide instead of ethyl iodide; bp 71°–72°C (0.15 mm).

Anal. Calcd for C$_9$H$_{11}$Cl$_2$F$_4$NOS: C, 32.93; H, 3.38; N, 4.27
Found: C, 33.04; H, 3.50; N, 4.00.

EXAMPLE 13

3-Allyl-2,2-bis(chlorodifluoromethyl)-4-thiazolidinone

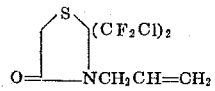

Potassium 2,2-bis(chlorodifluoromethyl)-4-thiazolidinone (9.1 g, 0.03 mol), 8 ml of dimethylformamide, and 3.8 g (0.05 mole) of allyl chloride were heated under reflux for 16 hours on a steam bath. The product was poured into water and the thiazolidinone was collected with ether, washed with 5 percent potassium hydroxide, dried (MgSO$_4$) and distilled to give 5.66 g (60%), bp 59°–61°C (0.12 mm).

Anal. Calcd for C$_8$H$_7$Cl$_2$F$_4$NOS: C, 30.79; H, 2.26; N, 4.49
Found: C, 30.91; H, 2.38; N, 4.30.

The reaction was also run in dimethylsulfoxide.

EXAMPLE 14

3-Benzyl-2,2-bis(chlorodifluoromethyl)-4-thiazolidinone

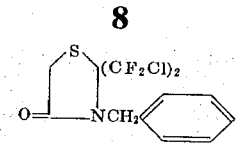

The benzyl derivative was made analogously to the ethyl derivative (Example 11) but using benzyl bromide instead of ethyl iodide. The product was distilled, bp 103°–105°C (0.5 mm) and recrystallized from methanol to give 3.0 g (27 percent) mp 43°–44°C.

Anal. Calcd for C$_{12}$H$_9$Cl$_2$F$_4$NOS: C, 39.79; H, 2.51; N, 3.87
Found: C, 39.31; H, 2.33; N, 3.84.

EXAMPLE 15

2,2-Bis(chlorodifluoromethyl)-3-(2-hydroxyethyl)-4-thiazolidinone

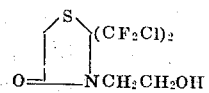

The hydroxyethylation was carried out as described for the allyl derivative (Example 13) but using 2-iodoethanol instead of allyl chloride. The compound was distilled at 98°–100°C (0.1 mm); 56 percent yield.

Anal. Calcd for C$_7$H$_7$Cl$_2$F$_4$NO$_2$S: C, 26.60; H, 2.23; N, 4.43
Found: C, 26.20; H, 2.28; N, 4.26.

EXAMPLE 16

2,2-Bis(chlorodifluoromethyl)-3-carbethoxymethyl-4-thiazolidinone

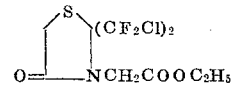

The carbethoxymethyl derivative was made analogously to the ethyl derivative (Example 11) except that ethyl bromoacetate was used in place of ethyl iodide. The product distilled at 90°–93°C (0.1 mm); 66 percent yield.

Anal. Calcd for C$_9$H$_9$Cl$_2$F$_4$NO$_3$S: C, 30.18; H, 2.53; N, 3.91
Found: C, 29.80; H, 2.65; N, 3.84.

The reaction was also carried out in dimethylsulfoxide instead of ethanol-water.

The ester can be hydrolyzed to the acid.

EXAMPLE 17

1,4-Bis[2,2-bis(chlorodifluoromethyl)-4-thiazolidinon-3-yl]butane

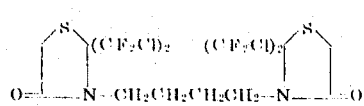

To a solution of 8.16 g (0.03 mol) of 2,2-bis(chlorodifluoromethyl)-4-thiazolidinone in 15 ml of ethanol was added 2 g (0.03 mol) of potassium hydroxide in 15 ml of ethanol followed by 4.7 g (0.015 mol) of 1,4-diiodobutane. The mixture was refluxed for 16 hours on a steam bath and the ethanol was then boiled off. The product was washed with water and recrystallized from methanol to give 3.25 g (36 percent) mp 134–136°C.

Anal. Calcd for $C_{14}H_{12}Cl_4F_8N_2O_2S_2$: C, 28.11; H, 2.02; N, 4.68
Found: C, 28.00; H, 1.82; N, 4.39.

EXAMPLE 18

2,2-Bis(chlorodifluoromethyl)-5,5-dimethyl-4-thiazolidinone

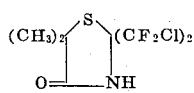

2-Mercaptoisobutyric acid (3.60 g, 0.03 mol) and 6.6 g (0.033 mol) of 1,3-dichlorotetrafluoroisopropylidenimine were heated on a steam bath under reflux for 16 hours. The product was stirred with 5% sodium bicarbonate and filtered off. Recrystallization from hexane gave 3.90 g (43 percent), mp 69°C.

Anal. Calcd for $C_7H_7Cl_2F_4NOS$: C, 28.01; H, 2.35; N, 4.67
Found: C, 27.85; H, 2.24; N, 4.49.

EXAMPLE 19

2,2-Bis(pentafluoroethyl)-4-thiazolidinone

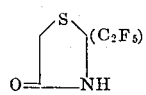

A solution comprising 7.95 g (0.03 mol) of 1-(pentafluoroethyl) pentafluoropropylidenimine, 3.04 g (0.33 mol) of mercaptoacetic acid, and 6 ml of dichloromethane was sealed in a glass tube and heated at 100°C for 16 hours. After evaporation of the solvent, the product was washed with water, dried and recrystallized from hexane; yield, 7.35 g (72 percent), mp 89.5°–90.5°C; $^1$H nmr (CDCl$_3$) 3.72 ppm (s, CH$_2$), 8.92 (broad peak, NH).

Anal. Calcd for $C_7H_3F_{10}NOS$: C, 24.78; H, 0.89; N, 4.13
Found: C, 24.56; H, 0.84; N, 4.00.

EXAMPLE 20

2-(Difluoromethyl)-2-(trifluoromethyl)-4-thiazolidinone

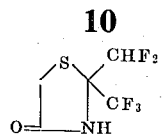

To 4.05 g (0.044 mol) of mercaptoacetic acid in 8 ml of dichloromethane was added 5.88 g (0.04 mol) of pentafluoroisopropylidenimine [W. J. Middleton, U.S. Pat. No. 3,342,864 (1967)]. After the solution had stood for 16 hours the solvent was boiled off and the product was washed with water and air dried. Recrystallization from hexane gave 5.14 g (58%), mp 97°–98°C.

Anal. Calcd for $C_5H_4F_5NOS$: C, 27.15; H, 1.82; N, 6.33
Found: C, 27.82; H, 1.96; N, 6.23.

EXAMPLES 21–24

Prepared according to the procedures given above were:

21: 2,2-Bis(chlorodifluoromethyl)-5-methyl-4-thiazolidinone, mp 82°–83°

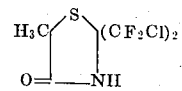

22: 2,2-Bis(chlorodifluoromethyl)-3,5-dimethyl-4-thiazolidinone, mp 72°–74°

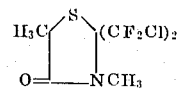

23: 2,2-Bis(chlorodifluoromethyl)-3,5-trimethyl-4-thiazolidinone, mp 84°–86°

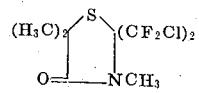

and

24: 2-(Difluoromethyl)-2-(trifluoromethyl)-3-methyl-4-thiazolidinone, bp 78° (4 mm)

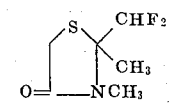

EXAMPLE 25

2,2-Bis(trifluoromethyl)-5-phenyl-4-thiazolidinone

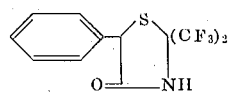

Hexafluoroisopropylidenimine (15 g, 0.091 mol), 15 ml of dichloromethane, and 15 g (0.089 mol) of α-mercaptophenylacetic acid were sealed in a glass tube and heated at 100° for 5 hr. After cooling, most of the product was filtered off. More was obtained by evaporating the filtrate and washing the residue with 5 percent sodium bicarbonate solution. The product was recrystallized from carbon tetrachloride to give 19.2 g (68 percent), mp 154°–155°C.

Anal. Calcd. for $C_{11}H_7F_6NOS$: C, 41.90; H, 2.24; N, 4.44
Found: C, 41.55; H, 2.10; N, 4.33.

Methylation gave the N-methyl derivative, m.p. 77°–78°C.

EXAMPLE 26

2,2-Bis(chlorodifluoromethyl)-5-phenyl-4-thiazolidinone 1,3-Dichlorotetrafluoroisopropylidenimine (8 g, 0.04 mol), 10 ml of carbon tetrachloride, and 6.72 g (0.04 mol) of α-mercaptophenylacetic acid were heated under reflux on a steam bath for 1 hr. The solvent was evaporated off and the residue was washed with 5 percent sodium bicarbonate solution to leave 12.5 g (89 percent) of product, mp 159°–160° after recrystallization from carbon tetrachloride.

Anal. Calcd. for $C_{11}H_7Cl_2F_4NOS$: C, 37.93; H, 2.03; N, 4.02
Found: C, 37.96; H, 1.93; N, 4.04.

Methylation gave the N-methyl derivative, m.p. 108°–109°C.

The practice of the invention is further shown by Table I. When the mercapto acid of column A is reacted with the imine of column B, the heterocycle of column C is obtained.

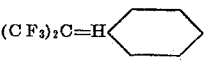

TABLE I

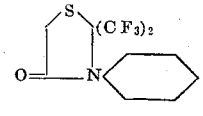

Substitution on the nitrogen of the heterocycle is further illustrated in Table II. When an alkali metal salt of the heterocycle of column A is reacted with the halide of column B, the product of column C is obtained.

TABLE II

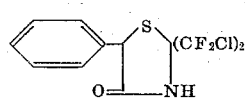

TABLE II—Continued

| Column A | Column B | Column C |
|---|---|---|
| [structure: S(CF3)2, NH, O=] | BrCH2CH2OC2H5 | [structure: S(CF3)2, NCH2CH2OC2H5, O=] |
| [structure: S, CF3, CF2Cl, NH, O=] | BrCH2CONH2 | [structure: S, CF3, CF2Cl, NCH2CONH2, O=] |
| [structure: S(CF3)2, NH, O=] | CH2I2 | [structure: bis S(CF3)2 with N—CH2—N bridge, O=...=O] |
| [structure: S(CF2Cl)2, NH, O=] | I(CH2)8I | [structure: bis S(CF2Cl)2 with N—(CH2)8—N bridge, O=...=O] |
| [structure: (CH3)2, S(CF2Cl)2, NH, O=] | ClCH2COCH2Cl | [structure: bis S(CF2Cl)2 with N—CH2COCH2—N bridge, O=...=O] |

Also, reaction of the compounds of column A with ketene produces N-acetyl derivatives. Reaction of compounds of columns A or C with molar amounts of peracetic acid gives the corresponding sulfoxides whereas with excess peracetic acid the sulfones result.

The utility of the compounds of the present invention as plasticizers is illustrated by the following example.

EXAMPLE A

A film of polyvinyl chloride was cast from tetrahydrofuran. When a strip of the film was drawn, it easily snapped in two.

A film was cast from a tetrahydrofuran solution containing 10 parts of polyvinyl chloride and 3 parts of the compound of Example 1. A strip of the film could be drawn to a ratio of 3.8 to form a strong, tough filament.

Similar results were obtained by incorporating the compound of Examples 16 into polyvinyl chloride.

Plant hormone activity is demonstrated by the following example.

EXAMPLE B

The compound of Example 10 was applied at 100 ppm on xanthium leaves. Ethylene production by the leaves as determined by gas chromatography was stimulated 570% over untreated controls. This is indicative of plant regulant activity useful in controlling fruit drop and increasing latex flow in rubber trees. The compound of Example 8 was effective in the prevention of germination of lettuce seeds.

Since obvious modifications and equivalents in the invention will be evident to those skilled in the arts, I propose to be bound solely by the appended claims.

The embodiments of the invention in which an exclusive property or privilege is claimed are defined as follows:

1. A compound having the formula

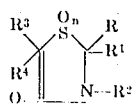

or

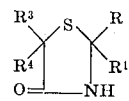

wherein $n$ is 0, 1 or 2.

R and $R^1$ are —$CF_2H$, —$CF_2Cl$, —$CF_3$ or $C_2F_5$ $R^3$ and $R^4$ are hydrogen, aryl, aralkyl, alkenyl, cycloalkyl, alkyl or carboxyalkyl each of up to 8 carbon atoms.

$R^2$ is hydrogen, alkyl, alkenyl, aryl, aralkyl, hydroxyalkyl, carbalkoxyalky, or haloalkyl each of up to 8 carbon atoms and X is a polymethylene radical of up to 8 carbon atoms, or —$CH_2COCH_2$—.

2. Composition of claim 1 having the formula

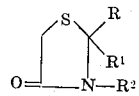

when R and $R^1$ are each —$CF_2Cl$, —$CF_3$ or $C_2F_5$ $R^3$ is H, —$CH_3$ or $CH_2COOH$, and $R^4$ is H or $CH_3$.

3. Composition of claim 2 wherein R and $R^1$ are each —$CF_2Cl$.

4. Composition of claim 3 wherein $R^3$ and $R^4$ are each H.

5. Composition of claim 1 having the formula

[structure shown]

where R and $R^1$ are each —$CF_2H$, —$CF_2Cl$, —$CF_3$ or $C_2F_5$ and $R^2$ is H, —$CH_3$, —$C_2H_5$, —$C_4H_9$, —$CH_2$—$CH=CH_2$ —$CH_2CH_2OH$, —$CH_2CO_2C_2H_5$, —$C_6H_5$, or —$CH_2C_6H_5$.

6. Composition of claim 5 where R and $R^1$ are each —$CF_3$.

7. Composition of claim 5 where R and $R^1$ are each —$CF_2Cl$.

8. Composition of claim 7 where $R^2$ is $CH_3$.

* * * * *

UNITED STATES PATENT OFFICE
CERTIFICATE OF CORRECTION

Patent No. 3,853,902                                 Dated December 10, 1974

Inventor(s)    Maynard S. Raasch

It is certified that error appears in the above-identified patent and that said Letters Patent are hereby corrected as shown below:

Col. 6, Example 10, line 51 - change "REcrystallization" to --Recrystallization--.

Col. 10, Example 24, in the formula - change "$\diagdown\begin{matrix}CHF_2\\CH_3\end{matrix}$" to --$\diagdown\begin{matrix}CHF_2\\CF_3\end{matrix}$--.

Col. 13, Table II - delete the first two formulas in columns A, B and C and replace with

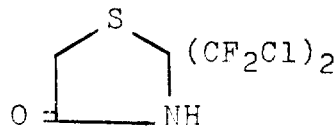   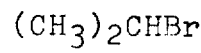   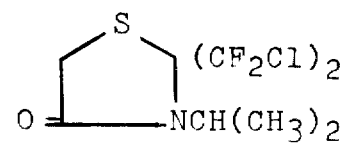

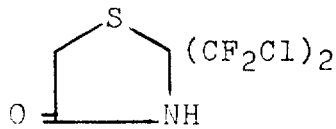   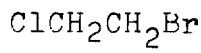   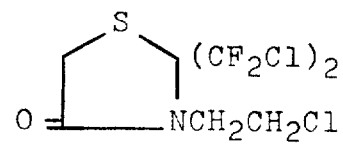

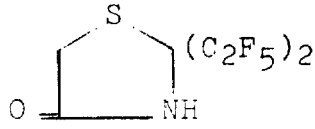   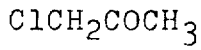   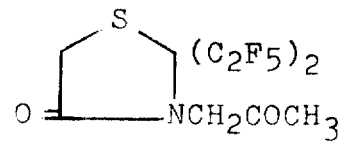

Signed and Sealed this twenty-second Day of July 1975

[SEAL]

Attest:

RUTH C. MASON
*Attesting Officer*

C. MARSHALL DANN
*Commissioner of Patents and Trademarks*